(12) United States Patent
Song

(10) Patent No.: US 12,215,490 B2
(45) Date of Patent: *Feb. 4, 2025

(54) ELECTRONIC PLUMBING FIXTURE FITTINGS WITH SHAPED AND LIMITED SENSOR DETECTION ZONES

(71) Applicant: Fortune Brands Water Innovations LLC, North Olmsted, OH (US)

(72) Inventor: Inho Song, Chesterland, OH (US)

(73) Assignee: Fortune Brands Water Innovations LLC, North Olmsted, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,208

(22) Filed: Jul. 14, 2023

(65) Prior Publication Data

US 2024/0084566 A1 Mar. 14, 2024

Related U.S. Application Data

(63) Continuation of application No. 16/786,157, filed on Feb. 10, 2020, now Pat. No. 11,702,826, which is a continuation of application No. 15/654,785, filed on Jul. 20, 2017, now Pat. No. 10,557,254.

(60) Provisional application No. 62/523,877, filed on Jun. 23, 2017, provisional application No. 62/364,342, filed on Jul. 20, 2016.

(51) Int. Cl.
*E03C 1/05* (2006.01)
*G01S 17/04* (2020.01)

(52) U.S. Cl.
CPC ............. *E03C 1/057* (2013.01); *G01S 17/04* (2020.01)

(58) Field of Classification Search
CPC ..................................................... E03C 1/057
See application file for complete search history.

(56) References Cited

U.S. PATENT DOCUMENTS

| | | | |
|---|---|---|---|
| 9,057,182 B1 | 6/2015 | Friedman | |
| 9,702,128 B2 | 7/2017 | Sawaski | |
| 10,010,223 B2 | 7/2018 | Burgo, Sr. | |
| 10,557,254 B2 | 2/2020 | Song | |
| 11,702,826 B2 | 7/2023 | Song | |
| 2015/0268342 A1 | 9/2015 | Tott | |
| 2017/0101766 A1* | 4/2017 | Blizzard | F16K 21/16 |

FOREIGN PATENT DOCUMENTS

| | | |
|---|---|---|
| JP | 2013164910 | 8/2013 |
| JP | 2015113604 | 6/2015 |

OTHER PUBLICATIONS

PCT/US2017/042975, International Search Report and Written Opinion; Oct. 18, 2017.

(Continued)

*Primary Examiner* — Lauren A Crane
(74) *Attorney, Agent, or Firm* — Calfee, Halter & Griswold LLP

(57) ABSTRACT

The present application discloses electronic plumbing fixture fittings, such as electronic faucets, with a shaped and limited sensor detection zone. Exemplary embodiments include devices with a plurality of overlapping sensors and devices with a single time-of-flight (TOF) sensor capable of detecting the presence or absence of an object whether or not water is flowing out of a discharge outlet in the in a TOF detection zone.

20 Claims, 10 Drawing Sheets

(56) References Cited

OTHER PUBLICATIONS

Non-Final Office Action dated May 3, 2019 from related case U.S. Appl. No. 15/654,785.
Response to Non-Final Office Action dated Sep. 3, 2019 from related case U.S. Appl. No. 15/654,785.

* cited by examiner

ELECTRONIC PLUMBING FIXTURE FITTINGS WITH SHAPED AND LIMITED SENSOR DETECTION ZONES

CROSS-REFERENCE TO RELATED APPLICATIONS

This case is a Continuation of U.S. patent application Ser. No. 16/786,157, filed Feb. 10, 2020, which is a Continuation of U.S. patent application Ser. No. 15/654,785, filed Jul. 20, 2017 (now U.S. Pat. No. 10,557,254, issued Feb. 11, 2020), which claims priority to, and any other benefit of, U.S. Provisional Patent Appl'n Ser. No. 62/364,342, filed Jul. 20, 2016, and U.S. Provisional Patent Appl'n Ser. No. 62/523,877, filed Jun. 23, 2017, the entire contents of all of which are hereby incorporated herein by reference in their entireties to the extent that they are not directly conflicting with the present application. This application is related to U.S. Pat. No. 9,194,110 ("the '110 patent"), which is incorporated by reference in its entirety to the extent that it is not directly conflicting with the present application.

BACKGROUND

Electronic plumbing fixture fittings are known in the art. The commonly owned '110 patent discloses exemplary electronic plumbing fixture fittings.

Most automatic touchless faucets with optical sensors operate based on the principle that the light emitted from a transmitter is reflected from an object and returns to the receiver, and the water is turned on if the received signal exceeds a certain trigger level. Commonly, in order to have a consistent and repeatable triggering, complex algorithms for improved rejection of false positive or false negative are employed beyond setting a simple trigger level. However, the signal level of the reflected light traveling back to the receiver is affected by the reflectivity of the object—i.e., the color, texture, glossiness, transparency, and size of the object affect how much the light reflects and returns to the receiver.

SUMMARY

The present application discloses electronic plumbing fixture fittings, such as electronic faucets, with shaped and limited sensor detection zones.

In some exemplary embodiments, a sensor comprises a time-of-flight (TOF) sensor capable of detecting the presence or absence of an object whether or not water is flowing out of a discharge outlet in a TOF detection zone. Surprisingly, it was discovered that an electronic plumbing fixture fitting can use a TOF sensor with the TOF sensor signal aimed directly at a stream of water from the discharge outlet and detect the absence of a hand or other triggering object while water is streaming from the discharge outlet to turn off the stream of water.

In an exemplary embodiment, an electronic plumbing fixture fitting comprises: a faucet body including a discharge outlet, the discharge outlet being operable to deliver water through an expected fluid flow volume; an electronically controlled valve in fluid communication with the faucet body upstream of the discharge outlet; at least one processor programmed to control the electronically controlled valve to selectively control a flow of fluid from the electronically controlled valve out the discharge outlet of the faucet body; and a time-of-flight (TOF) sensor in electrical communication with the processor and operably connected to the faucet body and positioned to transmit a sensing signal toward the expected fluid flow volume in a sensing signal volume; and wherein at least one of the at least one processor and the TOF sensor is configured to create a detection zone inside the sensing signal volume that overlaps at least a portion of the expected fluid flow volume; and wherein at least one of the at least one processor and the TOF sensor is configured to permit the TOF sensor to detect the presence or absence of an object in the detection zone whether or not water is flowing out of the discharge outlet through the expected fluid flow volume.

DETAILED DESCRIPTION

This Detailed Description merely describes exemplary embodiments of the invention and is not intended to limit the scope of the claims in any way. Indeed, the invention as claimed is broader than and unlimited by the preferred embodiments, and the terms used in the claims have their full ordinary meaning.

The present application discloses electronic faucets with a time-of-flight (TOF) sensor capable of detecting the presence or absence of an object whether or not water is flowing out of a discharge outlet in the in a TOF detection zone. Although the terms "presence" and "absence" of an object are used throughout, it is to be understood that these terms describe different states, that transitions between these states are typically used by exemplary systems, and that such transitions are inherent in the context of the terms "presence" and "absence" of an object. For example, the "appearance" of an object from the perspective of a sensor (a transition from absence to presence) will typically be used to turn ON the flow of fluid in some exemplary systems. As another example, the "disappearance" of an object from the perspective of the sensor (a transition from presence to absence) will typically be used to turn OFF the flow of fluid in those exemplary systems. Thus, in some exemplary embodiments, a sensor comprises a time-of-flight (TOF) sensor capable of detecting the appearance or disappearance of an object whether or not water is flowing out of a discharge outlet in a TOF detection zone. Surprisingly, it was discovered that an electronic plumbing fixture fitting can use a TOF sensor with the TOF sensor signal aimed directly at a stream of water from the discharge outlet and detect the disappearance of a hand or other triggering object while water is streaming from the discharge outlet to turn off the stream of water. This is surprising at least because the presence of the flowing water while attempting to detect the disappearance of the object changes the baseline state vis-à-vis the situation when there is no flowing water while attempting to detect the appearance of the object.

Figure 1A:
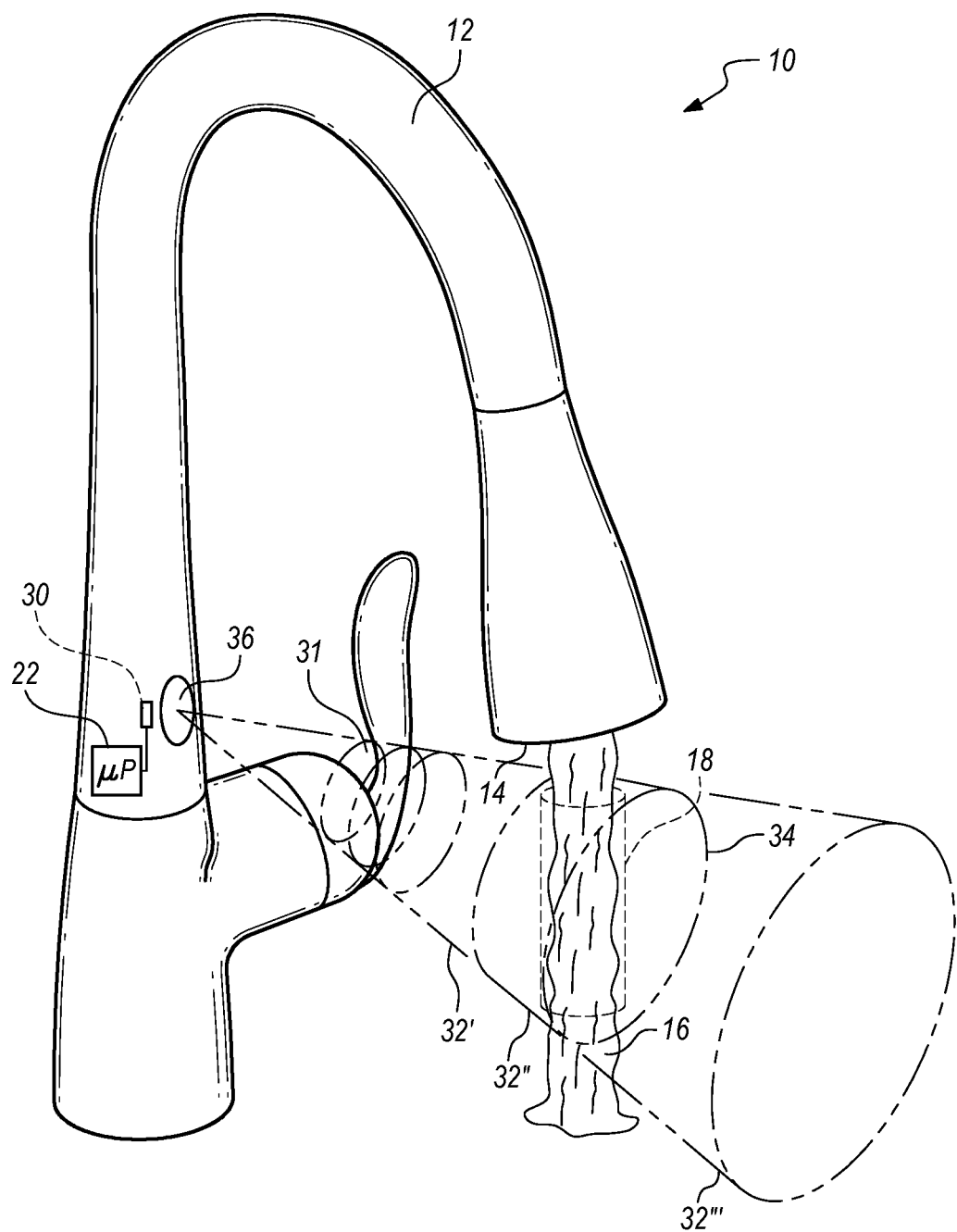
FIGS. 1A-1B are schematic diagrams of an exemplary electronic plumbing fixture fitting.

Referring now to FIG. 1A, an exemplary electronic plumbing fixture fitting 10 is shown. Exemplary electronic plumbing fixture fitting 10 includes a fixture body 12 including a discharge outlet 14, the discharge outlet being operable to deliver water 16 through an expected fluid flow volume 18. In some exemplary embodiments, the expected fluid flow volume 18 comprises a cylinder. In some exemplary embodiments, the expected fluid flow volume 18 comprises a frustum of a cone. An electronically controlled valve 20 (FIG. 3) in fluid communication with the fixture body 12 upstream of the discharge outlet 14 selectively controls flow of the water 16. At least one processor 22 is programmed to control the electronically controlled valve 20 to selectively control a flow of water 16 from the electronically controlled valve 20 out the discharge outlet 14 of the fixture body 12. The exemplary electronic plumbing fixture fitting 10 also includes at least one time-of-flight (TOF) sensor 30 in electrical communication with the processor 22 and positioned inside (or on) the fixture body 12 that transmits a sensing signal 31 toward the expected fluid flow volume 18 in a sensing signal volume 32. At least one of the processor 22 and the TOF sensor 30 is configured to create a detection zone 34 inside the sensing signal volume 32 (e.g., a subset of the sensing signal volume 32) that overlaps at least a portion of the expected fluid flow volume 18. In some exemplary embodiments, at least one of the processor 22 and the TOF sensor 30 is configured to permit the TOF sensor 30 to detect the presence or absence of an object, such as a user's hand, in the detection zone 34, whether or not water 16 is flowing out of the discharge outlet 14 through the expected fluid flow volume 18.

Although the processor 22 is shown schematically positioned inside the fixture body 12, in exemplary embodiments, the processor 22 can be positioned virtually anywhere as long as it can communicate with the sensor 30 and control the valves. "Processor" or "computer" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), complex programmable logic devices (CPLDs), etc. Exemplary electronic plumbing fixture fitting 10 has logic for performing the various functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like. In exemplary embodiments, some or all of the software is stored on memory, which includes one or more non-transitory computer readable media of one or more local or remote data storage devices (for remote memories, electronic plumbing fixture fitting 10 will include a communications circuit, not shown). As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., RAM, ROM, PROM, EPROM, EEPROM, flash PROM, external flash memory drives, etc.

Referring back to FIG. 1A, in some exemplary embodiments, the processor 22 and/or the TOF sensor 30 is configured to exclude from the detection zone 34 at least a proximal portion of the sensing signal volume 32' between the expected fluid flow volume 18 and the fixture body proximate the TOF sensor 30, thereby permitting a user to reach under the fixture body 12 proximate the TOF sensor 30 without causing the processor 22 to open the electronically controlled valve 20 while it is closed. This configuration also permits the faucet body 36 proximate the sensing signal volume to be wiped clean without causing the processor 22 to open the electronically controlled valve 20 while it is closed. In some exemplary embodiments, the processor 22 and/or the TOF sensor 30 is configured to exclude from the detection zone 34 at least a portion of the sensing signal volume 32''' outside the expected fluid flow volume 18, i.e., configured to exclude from the detection zone at least a distal portion of the sensing signal volume past the expected fluid flow volume, thereby permitting a user to walk up to the electronic plumbing fixture fitting without causing the processor to open the electronically controlled valve while it is closed. This configuration also permits user activity in front of the TOF sensor in the sensor field 32 away from the expected fluid flow volume 18 without causing the processor 22 to open the electronically controlled valve 20 while it is closed.

Figure 1B:
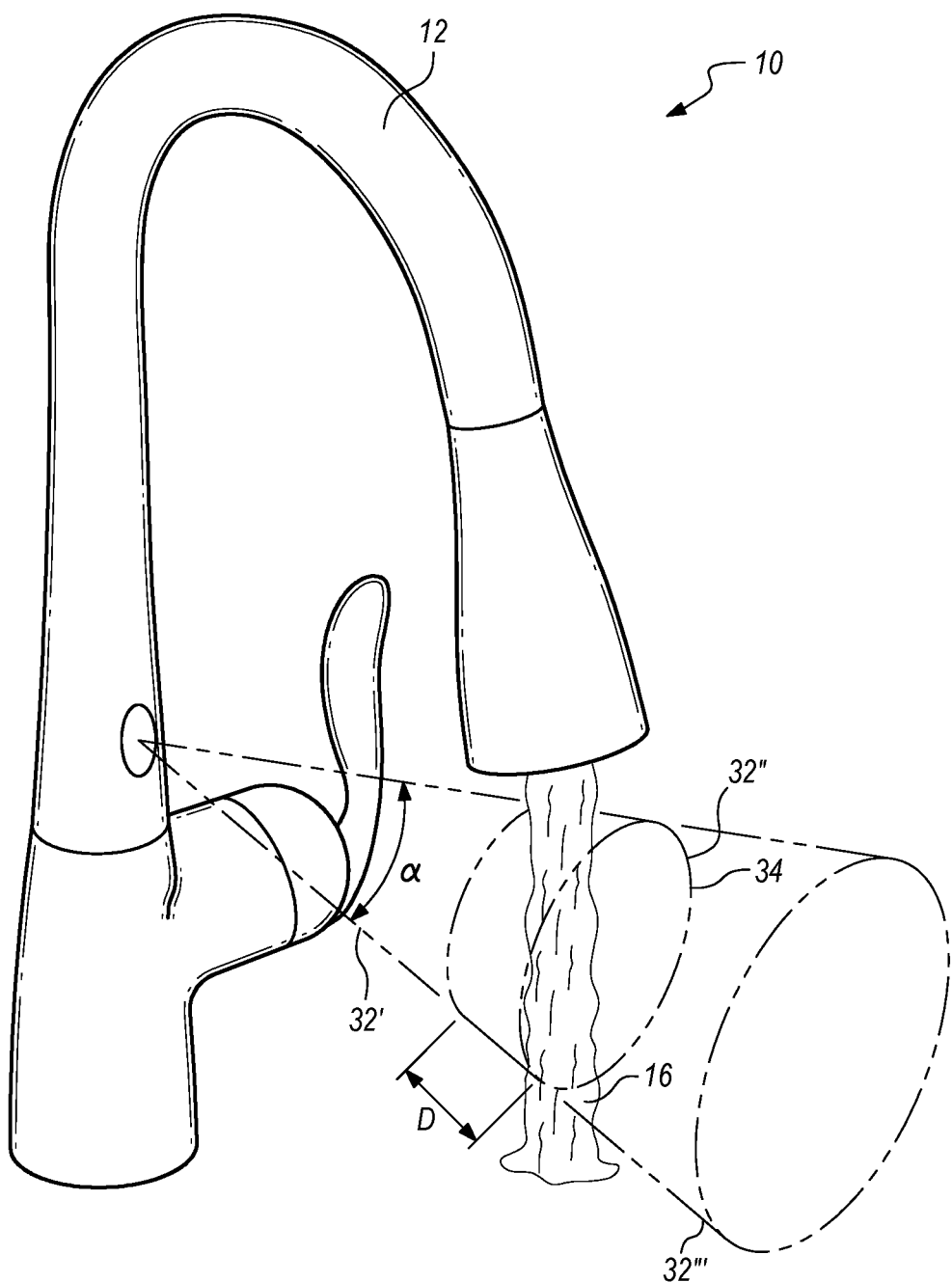
Figure 2:
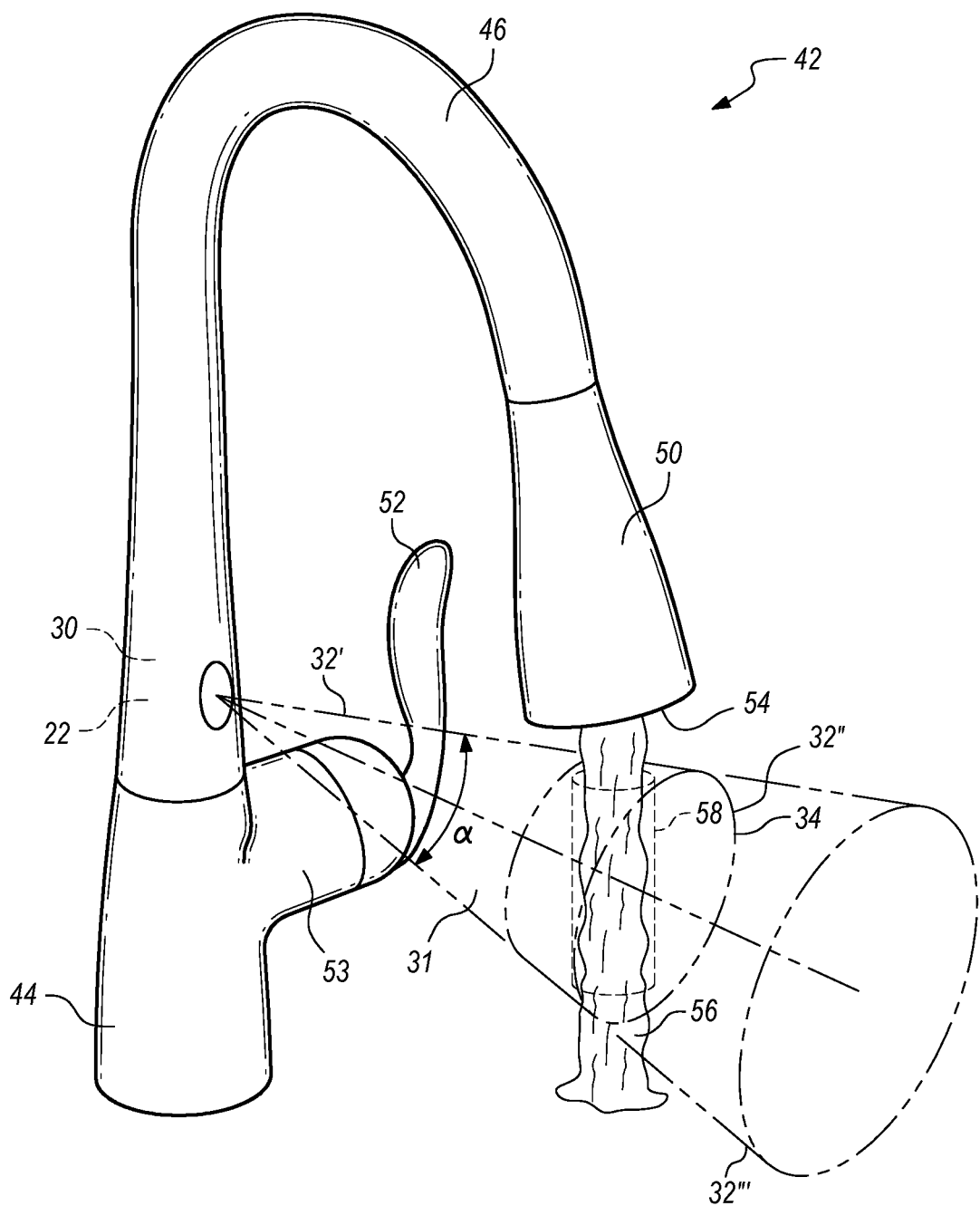
FIG. 2 is a schematic diagram of another exemplary electronic plumbing fixture fitting.

Referring now to FIG. 1B, in some exemplary embodiments, the processor 22 and/or the TOF sensor 30 is configured to create a detection zone 34 having a transmission angle α of about 20° to about 25°. Similarly, in some exemplary embodiments, the processor 22 and/or the TOF sensor 30 is configured to create a detection zone 34 having a detection depth D of about 10 mm to about 80 mm. In some exemplary embodiments, the processor 22 and/or the TOF sensor 30 is configured to create a detection zone 34 that is a section of a spherical shell, e.g., an intersection of a cone and a spherical shell, with the apex of the cone located at the TOF sensor (the square section in FIG. 2 is for illustrative purposes only). In some exemplary embodiments the TOF sensor 30 is configured to create a sensing signal volume 32 that has a prismatic conical shape with the apex of the cone located at the TOF sensor. The prismatic sides of the cone are defined by a window or aperture and/or lens system set about the emitter and/or detector of the TOF sensor.

An exemplary embodiment of an electronic plumbing fixture fitting of FIG. 1 is illustrated in FIG. 2 as an electronic faucet 42. In this exemplary embodiment, the faucet 42 includes a hub 44, a spout 46, a wand 50 having a wand hose (not shown; shown in the '110 patent), and a handle 52 extending from an associated handle hub 53. An upstream end of the hub 44 is connected to a mounting surface (such as a counter or sink). An upstream end of the spout 46 is connected to a downstream end of the hub 44. The spout 46 is operable to rotate relative to the hub 44. The wand hose (not shown; shown in the '110 patent) extends through the hub 44 and the spout 46 and is operable to move within the hub 44 and the spout 46. An upstream end of the wand 50 is mounted in a downstream end of the spout 46 and is connected to a downstream end of the wand hose. A downstream end of the wand 50 includes a discharge outlet 54 through which water 56 is delivered from the faucet 42. The wand 50 is operable to pull away from the spout 46. The handle 52 is connected to a side of the hub 44 and is operable to move relative to the hub 44. Although the faucet 42 has been described as having a rotatable spout 46, a pull-out or pull-down wand 50, and a handle 52 mounted on the hub 44, one of ordinary skill in the art will appreciate that, in certain embodiments, the spout 46 could be fixed relative to the hub 44, the faucet 42 may not include a wand 50, the handle 52 may be mounted on other locations on the faucet 42 or remote from the faucet 42, and/or the handle 52 may be any mechanical or other device that can be used to operate a mechanical valve. The electronic faucet 42 also includes at least one time-of-flight (TOF) sensor 30 in electrical communication with a processor 22 and positioned inside (or on) the fixture body 46 that transmits a sensing signal 31 toward expected fluid flow volume 58 in a sensing signal volume 32. Although the processor 22 is shown schematically positioned inside the fixture body 12, in exemplary embodiments, the processor 22 can be positioned virtually anywhere as long as it can communicate with the sensor 30 and control the valves. In some exemplary embodiments, the processor 22 is located in the handle hub 53. In other exemplary embodiments, the processor 22 is located proximate the valves below the counter or other surface supporting the faucet 42 (e.g., in electronics module 66 shown in U.S. Pat. No. 9,194,110). At least one of the processor 22 and the TOF sensor 30 is configured to create a detection zone 34 inside the sensing signal volume 32 (e.g., a subset of the sensing signal volume 32) that overlaps at least a portion of the expected fluid flow volume 58. In some exemplary embodiments, at least one of the processor 22 and the TOF sensor 30 is configured to permit the TOF sensor 30 to detect the presence or absence of an object, such as a user's hand, in the detection zone 34, whether or not water 56 is flowing out of the discharge outlet 54 through the expected fluid flow volume 58. In some exemplary embodiments, the expected fluid flow volume 58 comprises a cylinder. In some exemplary embodiments, the expected fluid flow volume 58 comprises a frustum of a cone.

Although the sensing signal volume 32 and the detection zone 34 are shown in the figures as being conical and frustoconical, respectively, other sensor signal configurations are possible, such as (a) a sensing signal volume that is oval in cross section or (b) a sensing signal volume that is a flat, rounded rectangle in cross section. In some exemplary embodiments, the processor 22 and/or the TOF sensor 30 and/or an aperture (e.g., a "collimator") and/or lens system through which the sensing signal passes (and which limits the size thereof) is configured to create a detection zone 34 having a transmission angle height of about 20° to about 25° and a transmission angle width of about 3° to about 20°. Similarly, in some exemplary embodiments, the processor 22 and/or the TOF sensor 30 is configured to create a detection zone 34 having a detection depth D (FIG. 1B) of about 10 mm to about 80 mm. In some exemplary embodiments, the processor 22 and/or the TOF sensor 30 and/or an aperture and/or lens system through which the sensing signal passes (and which limits the size thereof) is configured to create a vertically-oriented detection zone 34 having transmission angle width of about 3° to about 200 and a transmission angle height of about 350 to about 90°, e.g., about 40°, or about 60°, or about 90°, or about 35°-45° or about 40°-60° (all starting just below the lower, distal end of the fixture or wand, so they do not trigger the flow of fluid). In some exemplary embodiments, the processor 22 and/or the TOF sensor 30 and/or an aperture and/or lens system through which the sensing signal passes (and which limits the size thereof) is configured to create a detection zone 34 that is a section of a spherical shell. In some exemplary embodiments, the detection zone is not oriented vertically, but instead is oriented at an angle with respect to vertical.

Figure 3:
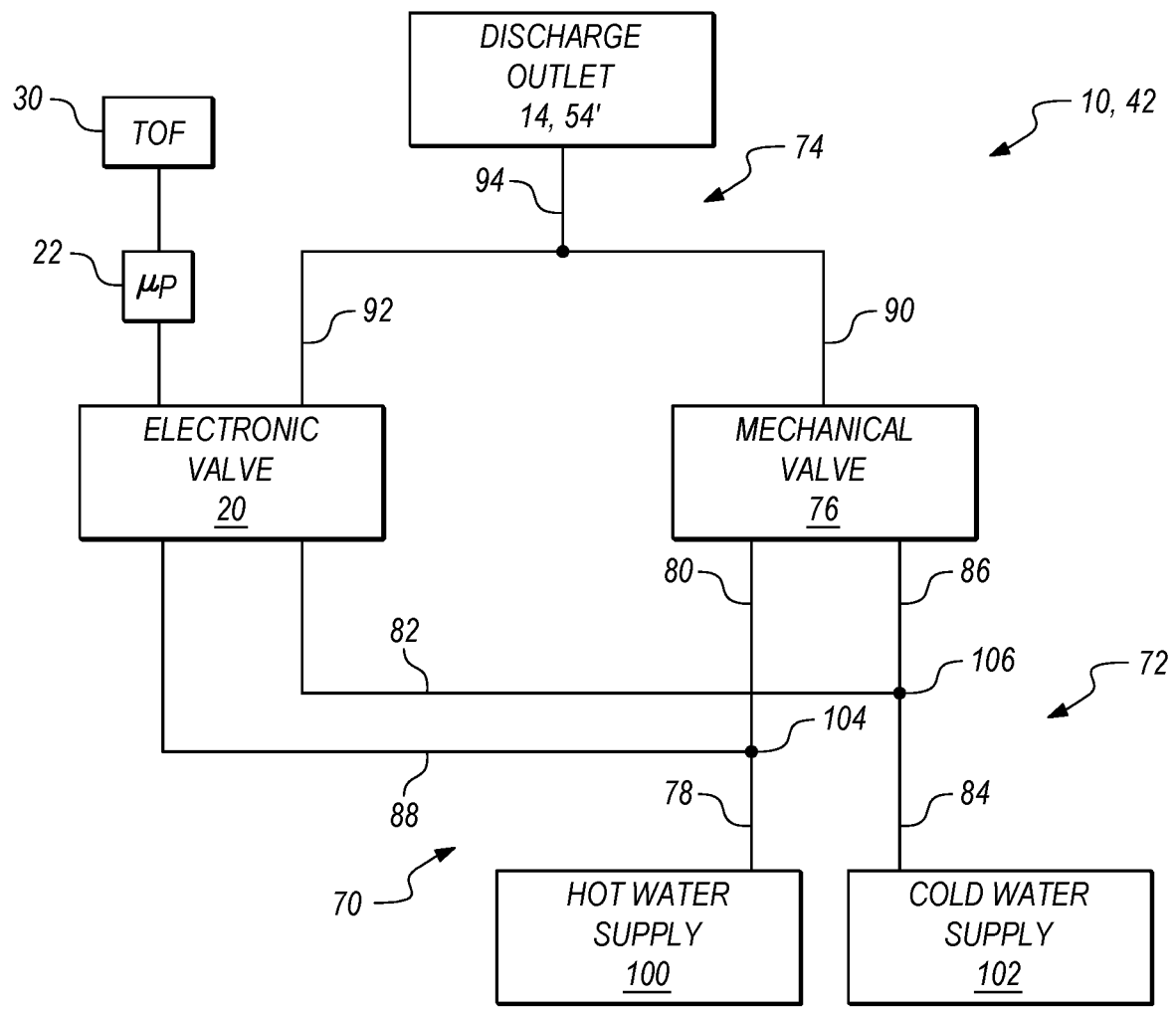
FIG. 3 is a schematic electrical/fluid flow schematic diagram of an exemplary electronic plumbing fixture fitting.

FIG. 3 shows an exemplary electrical and fluid flow representation for the embodiments of FIGS. 1-2. Other configurations are possible that take advantage of the TOF configuration herein. In some exemplary embodiments, the fitting 10, 42 includes a hot water line 70, a cold water line 72, a mixed water line 74, a mechanical valve 76, and an electronic valve 20. The hot water line 70 includes a common portion 78, a mechanical valve portion 80, and an electronic valve portion 82. The cold water line 72 includes a common portion 84, a mechanical valve portion 86, and an electronic valve portion 88. The mixed water line 74 includes a mechanical valve portion 90, an electronic valve portion 92, and a common portion 94. These components can be configured and arranged as discussed in the '110 patent. For example, in exemplary embodiments, an upstream end of the common portion 78 of the hot water line 70 connects to a hot water supply 100, and an upstream end of the common portion 84 of the cold water line 72 connects to a cold water supply 102. A downstream end of the common portion 78 of the hot water line 70 connects to a hot water tee 104, and a downstream end of the common portion 84 of the cold water line 72 connects to a cold water tee 106. An upstream end of the mechanical valve portion 80 of the hot water line 70 connects to the hot water tee 104, and an upstream end of the mechanical valve portion 86 of the cold water line 28 connects to the cold water tee 60. A downstream end of the mechanical valve portion 80 of the hot water line 70 connects to the mechanical valve 76, and a downstream end of the mechanical valve portion 4864 of the cold water line 72 connects to the mechanical valve 76. An upstream end of the electronic valve portion 88 of the hot water line 70 connects to the hot water tee 104, and an upstream end of the electronic valve portion 82 of the cold water line 72 connects to the cold water tee 106. A downstream end of the electronic valve portion 88 of the hot water line 70 connects to the electronic valve 20, and a downstream end of the electronic valve portion 82 of the cold water line 72 connects to the electronic valve 20.

Figure 4:
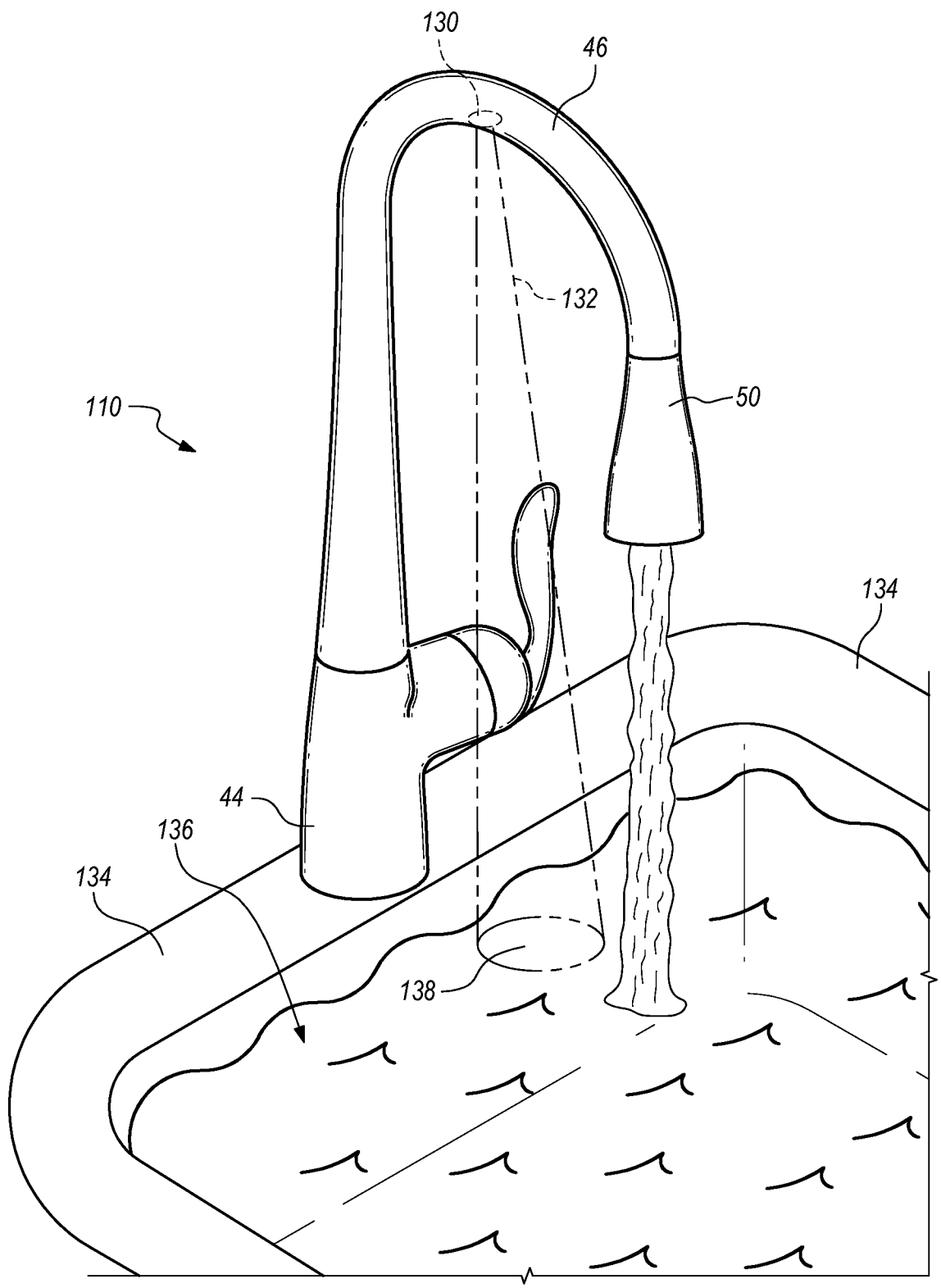
FIG. 4 is a schematic diagram of yet another exemplary electronic plumbing fixture fitting.

A TOF sensor may be used advantageously in sensor operated faucet designs in which the sensor is positioned facing downwards into the sink. In this orientation, it is difficult to use prior art infrared sensors because the reflectance of the sink surface varies depending on whether the sink is wet or dry. Consequently, calibrating a prior art infrared sensor to avoid a high incidence of false positive and false negative detection events under both wet and dry conditions is extremely difficult. In contrast, activation of the TOF sensor is insensitive to reflectance and the range of activation distances for a TOF sensor can be set to exclude reflections from the surface of the sink. Referring now to FIG. 4, another exemplary embodiment 110 is shown. In this exemplary embodiment 110, a TOF sensor 130 is positioned in the underside of pipe 46 at the top, and TOF sensor signal 132 aimed down into a sink 134 partially filled with water 136 to detect the depth of the water in the sink 134 (or tub), i.e., detect the distance from the TOF sensor 130 to a surface 138 of the water 136 so that a corresponding processor can calculate the depth of the water 136 in the sink using calibration data obtained beforehand and shut off the flow of water (e.g., using valve 20, FIG. 3), if needed. In some exemplary embodiments, calibration is done by a user filling a sink or tub as full as the user would want it to be filled for a normal task and then using a user interface to indicate to the processor 22 to remember this desired normal depth by e.g., saving data from the TOF sensor 30 corresponding to that depth. In exemplary embodiments, the user interface comprises the user interacting with the TOF sensor 30 (or other sensors) using specific patterns or gestures that are detected by the TOF sensor 30 (or other sensors) that are translated by the processor 22 to enter a program mode and store a depth corresponding to normal usage of the sink or tub. In addition, or in the alternative, in some exemplary embodiments, calibration is done by a user filling a sink or tub as full as the user would ever want it to be filled as a maximum depth and then using a user interface to indicate to the processor 22 to remember this maximum depth by e.g., saving data from the TOF sensor 30 corresponding to that maximum depth.

In some exemplary embodiments, the TOF sensor 30 is a STMicroelectronics model VL6180X proximity and ambient light sensing (ALS) module. Although not tested, it is believed that another suitable TOF sensor is the STMicroelectronics model VL53LOX sensor. In some exemplary embodiments using the VL6180X sensor as TOF sensor 30, the VL6180X TOF sensor 30 registers are programmed as follows, which permits the VL6180X TOF sensor to detect the presence or absence of an object, such as a user's hand, in the detection zone 34, whether or not water 16, 56 is flowing out of the discharge outlet 14, 54 through the expected fluid flow volume 18, 58:

WriteByte(0x0207, 0x01);
WriteByte(0x0208, 0x01);
WriteByte(0x0096, 0x00);
WriteByte(0x0097, 0xfd);
WriteByte(0x00e3, 0x00);
WriteByte(0x00e4, 0x04);
WriteByte(0x00e5, 0x02);
WriteByte(0x00e6, 0x01);
WriteByte(0x00e7, 0x03);
WriteByte(0x00f5, 0x02);
WriteByte(0x00d9, 0x05);
WriteByte(0x00db, 0xce);
WriteByte(0x00dc, 0x03);
WriteByte(0x00dd, 0xf8);
WriteByte(0x009f, 0x00);
WriteByte(0x00a3, 0x3c);
WriteByte(0x00b7, 0x00);
WriteByte(0x00bb, 0x3c);
WriteByte(0x00b2, 0x09);
WriteByte(0x00ca, 0x09);
WriteByte(0x0198, 0x01);
WriteByte(0x01b0, 0x17);
WriteByte(0x01ad, 0x00);
WriteByte(0x00ff, 0x05);
WriteByte(0x0100, 0x05);
WriteByte(0x0199, 0x05);
WriteByte(0x01a6, 0x1b);
WriteByte(0x01ac, 0x3e);
WriteByte(0x01a7, 0x1f);
WriteByte(0x0030, 0x00);
WriteByte(0x0011, 0x10);
WriteByte(0x010a, 0x30);
WriteByte(0x003f, 0x46);
WriteByte(0x0031, 0xFF);
WriteByte(0x0040, 0x63);
WriteByte(0x016, 0x00);
WriteByte(0x002e, 0x01);
WriteByte(0x001b, 0x09);
WriteByte(0x003e, 0x31);
WriteByte(0x0014, 0x24);

One exemplary implementation of an exemplary system uses a VL6180X sensor as a TOF sensor 30 mounted in a MOEN brand MOTIONSENSE brand faucet, model number 7594E. In this exemplary implementation, the expected fluid flow volume 18, 58 is approximately a cylinder having a diameter of about 12 mm (or a frustum of a cone having a diameter of about 12 mm at the top and about 12 mm at the bottom) and the detection zone 34 has a width of about 50 mm. The expected fluid flow volume 18, 58 is approximately 190 mm from the VL6180X TOF sensor 30 at its closest point (expected fluid flow volume 18, 58 is approximately parallel with the longitudinal axis of the hub 44, FIG. 2). With the VL6180X registers programmed as discussed above, the VL6180X TOF sensor can detect the presence or absence of an object, such as a user's hand, in the detection zone 34, whether or not water 16, 56 is flowing out of the discharge outlet 14, 54 through the expected fluid flow volume 18, 58.

In the '110 patent, the presence sensor 72 of that patent can be implemented as a TOF sensor as discussed herein, e.g., a VL6180X TOF sensor 30 with registers programmed as set forth herein (with a processor pre-programmed as set forth in the '110 patent, except as clarified herein with respect to the TOF sensor 30). In addition to the teachings herein, or in the alternative, the toggle sensor 70 of that patent can be implemented as a TOF sensor as discussed herein, e.g., a VL6180X TOF sensor 30 with registers programmed as set forth herein (with a processor pre-programmed as set forth in the '110 patent, except as clarified herein with respect to the TOF sensor 30). Using a TOF sensor discussed above as a presence sensor 72 and/or using a TOF sensor as discussed above as a toggle sensor 70 would have the advantages discussed herein. Additionally, using a TOF sensor as a toggle sensor 70 and/or as a presence sensor 72 would have the following additional advantages: unlike the intensity-based detection methods, the time-of-flight detection of the presence is based on the light travel time measurement and this time measurement is very much independent of the reflectivity of the object, i.e., color, surface roughness, and texture, for instance.

Figure 5:
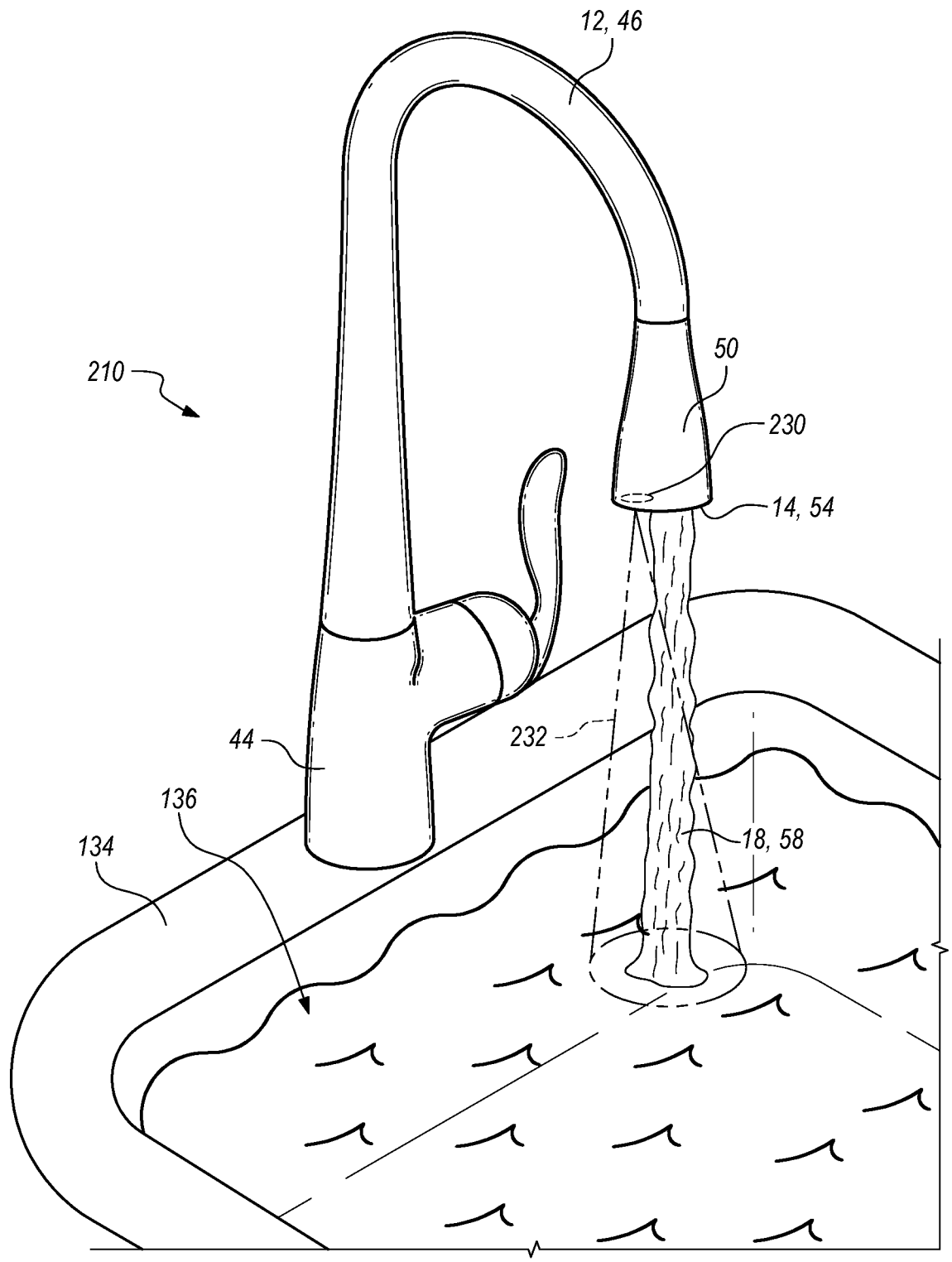
FIG. 5 is a schematic diagram of still another exemplary electronic plumbing fixture fitting.

In a different exemplary embodiment, it is further advantageous to position the TOF sensor of the current invention close to the outlet of the faucet such that the axis of the sensing signal volume is close to and parallel or nearly parallel to the central axis of the expected fluid flow volume. With the TOF sensor positioned thus the surface or surfaces defining the detection volume that do not intersect the expected fluid flow volume may be located very near to the surface of the fluid flow volume and almost symmetrically about the fluid flow volume. When the geometries of the sensing signal volume and the expected fluid flow volume are closely matched, opportunities for inadvertent activation are further minimized. Referring now to FIG. 5, another exemplary embodiment 210 is shown. In this exemplary embodiment 210, a TOF sensor 230 is positioned close to the outlet 14, 54 of the faucet such that the axis of the sensing signal volume is close to and parallel or nearly parallel to the central axis of the expected fluid flow volume 18, 58.

Figure 13:
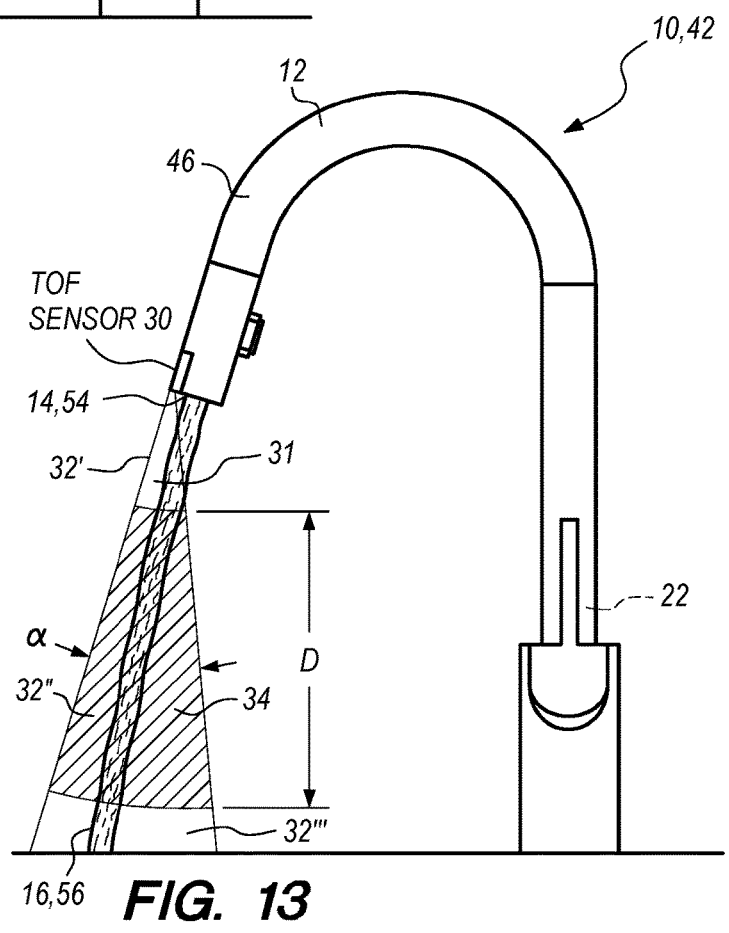
FIG. 13 shows another exemplary TOF sensor embodiment.

Referring now to FIG. 13, another embodiment with a TOF sensor 30 is shown. In this embodiment, the TOF sensor 30 is positioned in the fixture body 12 or spout 46, proximate the discharge outlet 14, 54 through which water 16, 56 is delivered from the faucet 10, 42. In this exemplary embodiment, wiring (not shown) inside the fixture body 12 or spout 46 connects the TOF sensor 30 with the processor 22. In this exemplary embodiment, the sensing signal 31 is transmitted to substantially overlap the flow of fluid 16, 56, in contrast with some of the other embodiments in which the sensor signal 31, A, B crosses the flow of fluid 16, 56.

Referring back to FIGS. 1A, 1B, and 2, and also to FIG. 13, it is apparent that the detection zone 34 (sensing signal volume subset 32") is both shaped and limited. That is, it is apparent that the detection zone 34 is shaped like a frustum of a cone because of the nature of the TOF sensor and the detection zone 34 is limited in size and range by the gating of the TOF sensor 30. This is perhaps shown best in FIGS. 1A and 13 where there is an active sensing signal volume 32" forming the detection zone 34 created by an excluded proximal portion of the sensing signal volume 32' between the expected fluid flow volume 18 and the fixture body proximate the TOF sensor 30 and an excluded distal portion 32''' of the sensing signal volume past the expected fluid flow volume. Thus, the previously described embodiments form a shaped and limited sensor detection zone using a single TOF sensor.

In exemplary embodiments, the shape and limit of a shaped and limited sensor detection zone are selected to exclude undesirable trigger zones, such as preventing a rotating spout from activating the water when the spout has been rotated to a position outside the sink, for instance. As another example, in some faucets with a long handle, the water may be inadvertently turned on when the handle is in the field of view. In order to prevent this, in exemplary embodiments, the shape and size (i.e., solid angle) of the light emission cone is shaped such that the transmitted light will avoid the volume of the space where the handle can interfere with the automatic activation of the water. As yet another example of the benefit of defined sensing volume in space is in a case where the user wants to clean the faucet. When the user wipes the spout with a towel, the water is turned on if the towel passed over a single sensor even though the user's intent was to just wipe the faucet not to turn the water on. This type of accidental activation is eliminated by excluding such areas by Boolean AND operation the two intersecting fields of view.

Figure 6:
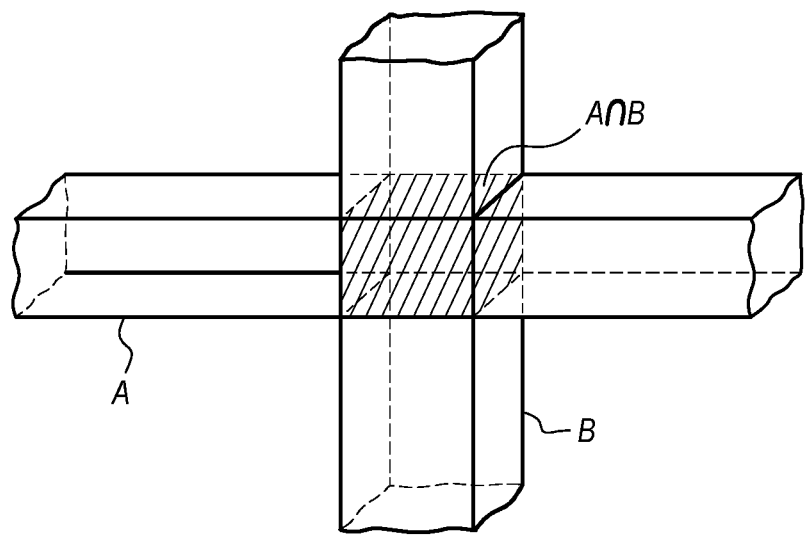
FIG. 6 is a schematic representation of exemplary overlapping sensor signals.

Accordingly, in some exemplary embodiments, a shaped and limited sensor detection zone is created using a plurality of sensors in different locations with overlapping detection zones. Exemplary embodiments utilize optical sensor technology with Boolean arithmetic to restrict and define the sensing zone in the 3-dimensional space. As shown conceptually in FIG. 6, in exemplary embodiments, a shaped and limited sensor zone (cross-hatched in FIG. 6) is formed by intersecting sensor volumes, e.g., the intersection of a first sensor detection zone A from sensor A (not shown) and a second sensor detection zone B from sensor B (not shown). Together, sensors A and B form a shaped and limited sensor detection zone. An object detected by sensor A and also detected by sensor B is in the shaped and limited sensor detection zone. The overlapping sensor volume defined, therefore, can be said to be A AND B (crosshatched). In some exemplary embodiments, with this coded into the trigger algorithm of the sensor (and/or a corresponding processor), the water can be turn on if and only if the object is within the sensing volume defined by the two intersecting fields of view of the sensors.

Figure 7:
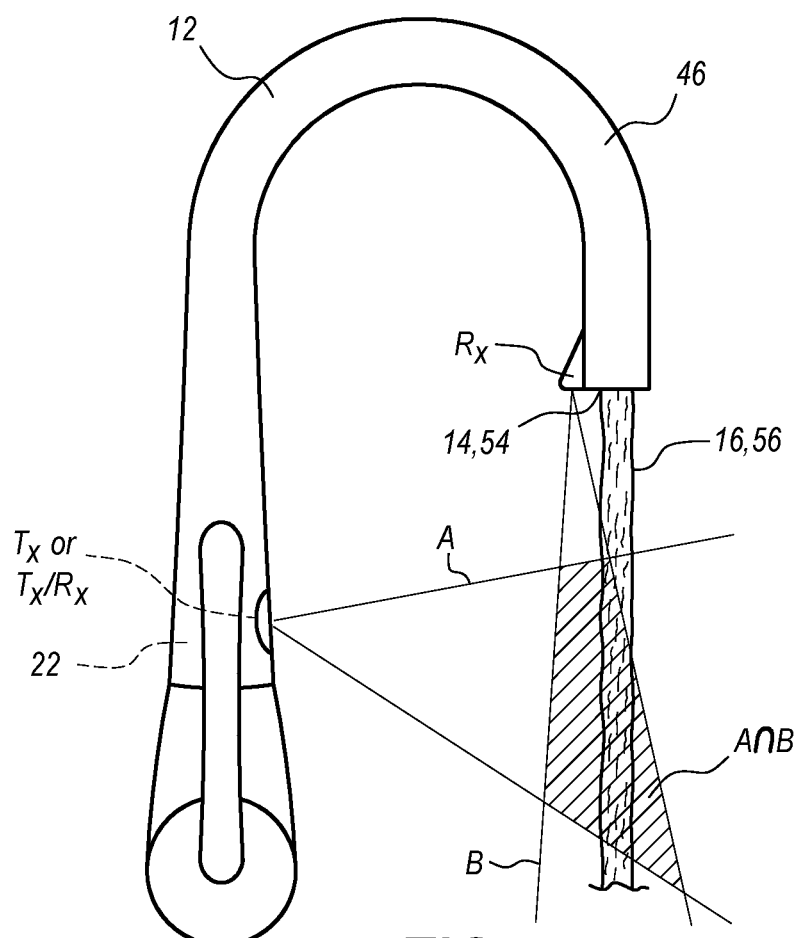
FIGS. 7-12 show exemplary overlapping sensor embodiments with different overlapping sensor signal configurations.

FIG. 7 shows an exemplary embodiment in which a transceiver of electromagnetic radiation Tx/Rx (e.g., an infrared transceiver) is mounted on the fixture body 12 or spout 46 across from the water 16, 56 and a receiver of electromagnetic radiation sensor Rx (e.g., an infrared detector) is mounted outside the fixture body 12 or spout 46, proximate the discharge outlet 14, 54 through which water 16, 56 is delivered from the faucet 10, 42. In this exemplary embodiment, the sensor Rx detects electromagnetic radiation emitted by the transceiver Tx/Rx. In this exemplary configuration, a shaped and limited sensor zone A∩B (cross-hatched in FIG. 7) is formed by intersecting sensor volumes, e.g., the intersection of a first sensor detection zone A from the transceiver Tx/Rx and a second sensor detection zone B from receiver Rx. Together, the transceiver Tx/Rx and the receiver Rx form a shaped and limited sensor detection zone. An object detected by transceiver Tx/Rx and also detected by receiver Rx is in the shaped and limited sensor detection zone A∩B. In some exemplary embodiments, with this coded into the trigger algorithm of the sensor (and/or a corresponding processor), the processor will turn on the water if and only if the triggering object is within the sensing volume A∩B defined by the two intersecting fields of view of the sensors. In some exemplary embodiments, the transceiver Tx/Rx is replaced with a transmitter that transmits electromagnetic radiation detected by the receiver Rx.

Figure 8:
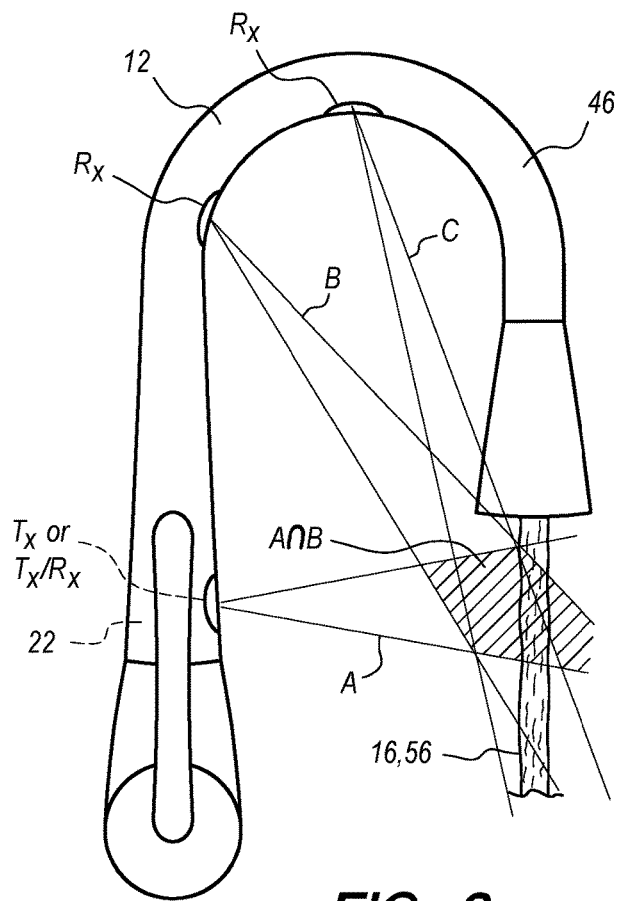

FIG. 8 shows another exemplary embodiment in which a transceiver of electromagnetic radiation Tx/Rx (e.g., an infrared transceiver) is mounted on the fixture body 12 or spout 46 across from the water 16, 56 (as discussed above) and a receiver of electromagnetic radiation sensor Rx (e.g., an infrared detector) is mounted higher up on the fixture body 12 or spout 46. In this exemplary embodiment, the sensor Rx detects electromagnetic radiation emitted by the transceiver Tx/Rx. In this exemplary configuration, a shaped and limited sensor zone A∩B (cross-hatched in FIG. 8) is formed by intersecting sensor volumes, e.g., the intersection of a first sensor detection zone A from the transceiver Tx/Rx and a second sensor detection zone B from receiver Rx. Together, the transceiver Tx/Rx and the receiver Rx form a shaped and limited sensor detection zone. An object detected by transceiver Tx/Rx and also detected by receiver Rx is in the shaped and limited sensor detection zone A∩B. In some exemplary embodiments, with this coded into the trigger algorithm of the sensor (and/or a corresponding processor), the processor will turn on the water if and only if the triggering object is within the sensing volume A∩B defined by the two intersecting fields of view of the sensors. In some exemplary embodiments, the transceiver Tx/Rx is replaced with a transmitter that transmits electromagnetic radiation detected by the receiver Rx. In some exemplary embodiments, a third receiver or transceiver (e.g., C in FIG. 8) is used to further limit the shape and/or size of the detection zone, e.g., limiting the detection zone to A∩B∩C.

Figure 9:
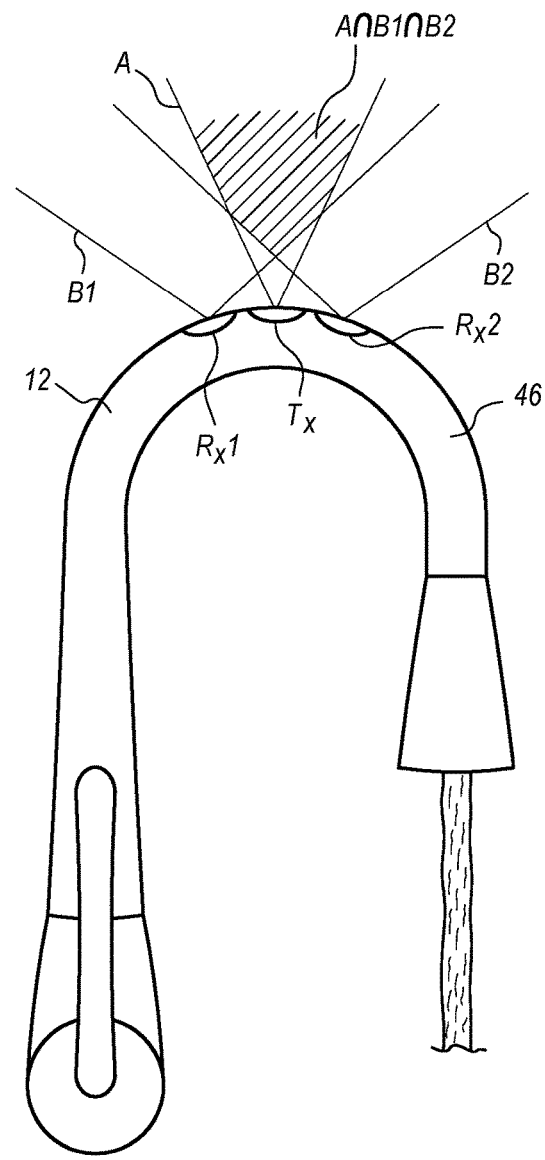

FIG. 9 shows another exemplary embodiment in which a transmitter of electromagnetic radiation Tx (e.g., an infrared LED) and two receivers of electromagnetic radiation sensor Rx1, Rx2 (e.g., infrared detectors) are mounted higher on the fixture body 12 or spout 46 proximate the apex of thereof and aimed upwards (rather than being aimed at the expected flow of fluid 16, 56 as in other embodiments). In this exemplary embodiment, the sensors Rx1, Rx2 detect electromagnetic radiation emitted by the transmitter Tx. In this exemplary configuration, a shaped and limited sensor zone A∩B1∩B2 (cross-hatched in FIG. 9) is formed by intersecting sensor volumes, e.g., the intersection of a first sensor detection zone A from the transmitter Tx, a second sensor detection zone B from receiver Rx1, and a third sensor detection zone B2 from receiver Rx2. Together, the transmitter Tx and the receivers Rx1, Rx2 form a shaped and limited sensor detection zone. An object detected by transmitter Tx and also detected by receivers Rx1, Rx2 is inside the shaped and limited sensor detection zone A∩B1∩B2. In some exemplary embodiments, with this coded into the trigger algorithm of the sensor (and/or a corresponding processor), the processor will turn on the water if and only if the triggering object is within the sensing volume A∩B1∩B2 defined by the three intersecting fields of view of the sensors. In some exemplary embodiments, the transmitter Tx is replaced with a transceiver Tx/Rx that transmits electromagnetic radiation detected by the receivers Rx1, Rx2 and also is capable of detecting an object without input from the receivers Rx1, Rx2.

Figure 10:
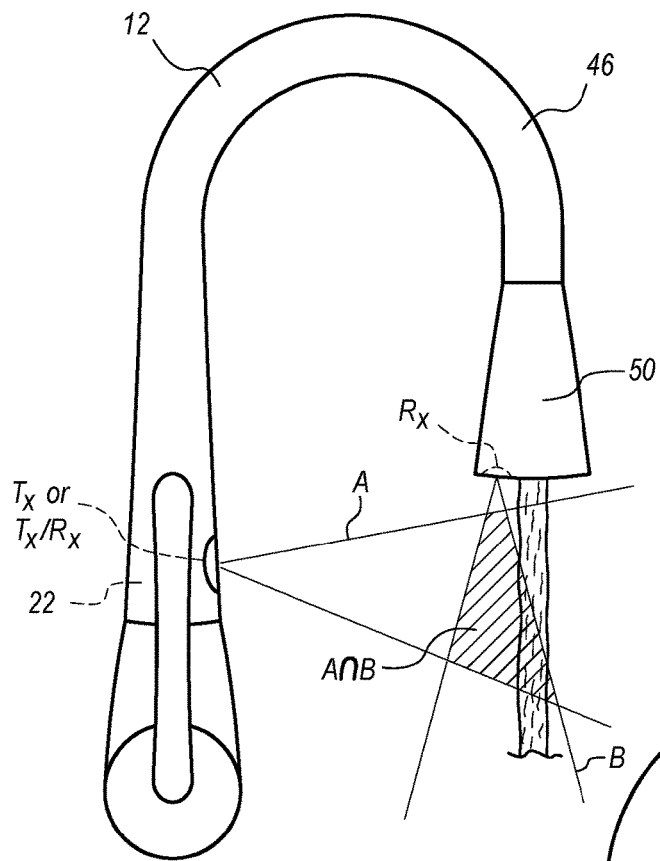

FIG. 10 shows another exemplary embodiment that is very similar to FIG. 7, except the receiver Rx is mounted in a wand 50. This adds complexity to the system because wiring connecting the receiver Rx to the processor 22 (not shown)—or other communication means—must be capable of extending from the fixture body 12 or spout 46 to permit the wand to extend therefrom.

Figure 11:
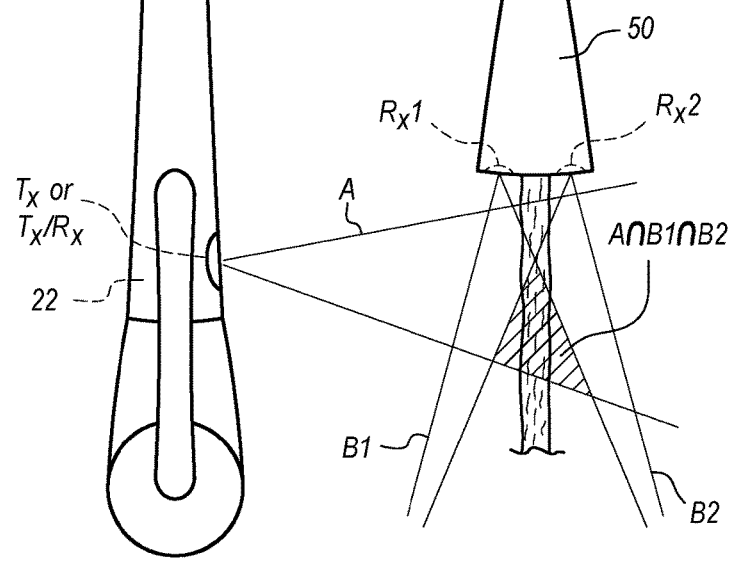

FIG. 11 shows another exemplary embodiment that is very similar to FIG. 9, except the receivers Rx1, Rx2 are mounted in a wand 50. This adds complexity to the system because wiring connecting the receivers Rx1, Rx2 to the processor 22 (not shown)—or other communication means—must be capable of extending from the fixture body 12 or spout 46 to permit the wand to extend therefrom. Like the embodiment of FIG. 9, an object detected by transmitter Tx (or transceiver Tx/Rx) and also detected by receivers Rx1, Rx2 is inside the shaped and limited sensor detection zone A∩B1∩B2. In some exemplary embodiments, with this coded into the trigger algorithm of the sensor (and/or a corresponding processor), the processor will turn on the water if and only if the triggering object is within the sensing volume A∩B1∩B2 defined by the three intersecting fields of view of the sensors.

Figure 12:
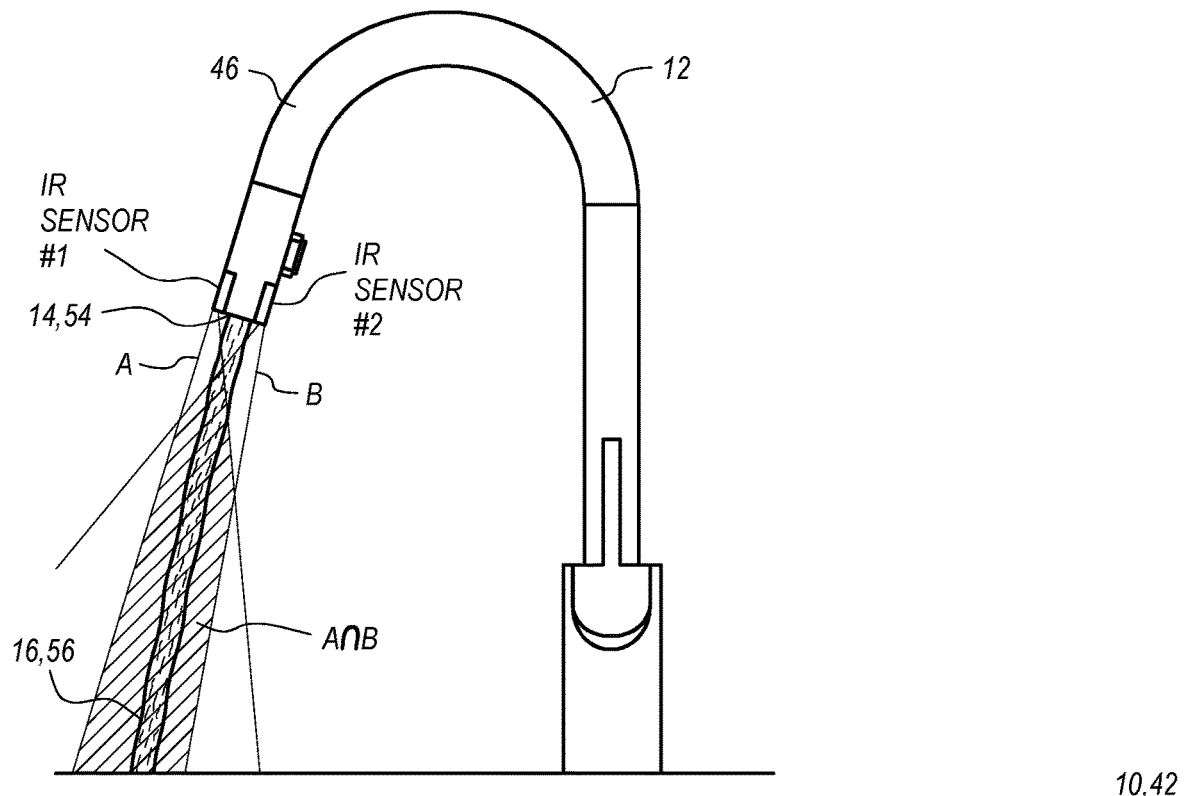

FIG. 12 shows another exemplary embodiment that is very similar to FIG. 11, sensors are positioned in the fixture body 12 or spout 46, proximate the discharge outlet 14, 54 through which water 16, 56 is delivered from the faucet 10, 42.

In exemplary embodiments, the different overlapping sensors described herein are located and used to control fluid flow, such as described in the '110 patent and herein, and/or located and used to control a flow of fluid, e.g., by creating an overlapping detection zone that overlaps at least a portion of an expected fluid flow volume to control the flow of fluid.

As can be appreciated from this disclosure, one benefit of the approaches of FIGS. 7-12 herein is an ability to maintain the use of inexpensive sensors and electronics but with a simple addition of another low-cost sensor a well-defined sensing volume is created in a desired space. In exemplary embodiments, this is optically accomplished through the design of the sensing field of view and the transmitting field of light source by the use of shaped apertures.

As described herein, when one or more components are described as being connected, joined, affixed, coupled, attached, or otherwise interconnected, such interconnection may be direct as between the components or may be indirect such as through the use of one or more intermediary components. Also, as described herein, reference to a "member," "component," or "portion" shall not be limited to a single structural member, component, or element but can include an assembly of components, members or elements.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, detection of presence in the situation where the sensor faces downward into the sink such as bathroom faucet and sink where the reflectance of the sink surface varies depending upon the wetness of the sink surface. In this instance, the range of activation is set anywhere between the position of sensor and the surface of the sink, while excluding any signals from the surface of the sink and farther. As another example, a downward facing TOF sensor of the current invention may be used to detect the level of water in the sink. This information may be used, for example, in an application of a "smart" faucet that fills the sink with water to a prescribed level regardless of the quantity or volume of objects in the sink. As yet another example, multiple TOF sensors of the current invention having intersecting or non-intersecting sensing signal volumes may be used advantageously to define a detection zone having a shape impossible to create with a single TOF sensor. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. An electronic plumbing fixture fitting, comprising:
   a faucet body including a discharge outlet, the discharge outlet being operable to deliver water through an expected fluid flow volume;
   an electronically controlled valve in fluid communication with the faucet body upstream of the discharge outlet;
   at least one processor programmed to control the electronically controlled valve to selectively control a flow of fluid from the electronically controlled valve out the discharge outlet of the faucet body; and
   a time-of-flight (TOF) sensor in electrical communication with the processor and operably connected to the faucet body and positioned to transmit a sensing signal toward the expected fluid flow volume in a sensing signal volume; and
   wherein at least one of the at least one processor and the TOF sensor is configured to create a detection zone inside the sensing signal volume that overlaps at least a portion of the expected fluid flow volume; and
   wherein at least one of the at least one processor and the TOF sensor is configured to permit the TOF sensor to detect the presence or absence of an object in the detection zone whether or not water is flowing out of the discharge outlet through the expected fluid flow volume.

2. The electronic plumbing fixture fitting according to claim 1, wherein at least one of the at least one processor and the TOF sensor is configured to exclude from the detection zone at least a portion of the sensing signal volume between the expected fluid flow volume and the faucet body proximate the TOF sensor, thereby permitting the faucet body proximate the sensing signal volume to be wiped clean without causing the processor to open the electronically controlled valve while it is closed.

3. The electronic plumbing fixture fitting, according to claim 1, wherein at least one of the at least one processor and the TOF sensor is configured to exclude from the detection zone at least a distal portion of the sensing signal volume past the expected fluid flow volume, thereby permitting a user to walk up to the electronic plumbing fixture fitting without causing the processor to open the electronically controlled valve while it is closed.

4. The electronic plumbing fixture fitting, according to claim 2, wherein at least one of the at least one processor and the TOF sensor is configured to exclude from the detection zone at least a distal portion of the sensing signal volume past the expected fluid flow volume, thereby permitting a user to walk up to the electronic plumbing fixture fitting without causing the processor to open the electronically controlled valve while it is closed.

5. The electronic plumbing fixture fitting, according to claim 1, wherein at least one of the at least one processor and the TOF sensor is configured to exclude from the detection zone substantially all of the sensing signal volume between the expected fluid flow volume and the faucet body proximate the TOF sensor, thereby permitting the faucet body proximate the TOF sensor to be wiped clean without causing the processor to open the electronically controlled valve while it is closed.

6. The electronic plumbing fixture fitting, according to claim 2, wherein at least one of the at least one processor and the TOF sensor is configured to exclude from the detection zone substantially all of the sensing signal volume between the expected fluid flow volume and the faucet body proximate the TOF sensor, thereby permitting the faucet body proximate the TOF sensor to be wiped clean without causing the processor to open the electronically controlled valve while it is closed.

7. The electronic plumbing fixture fitting, according to claim 3, wherein at least one of the at least one processor and the TOF sensor is configured to exclude from the detection zone substantially all of the sensing signal volume between the expected fluid flow volume and the faucet body proximate the TOF sensor, thereby permitting the faucet body proximate the TOF sensor to be wiped clean without causing the processor to open the electronically controlled valve while it is closed.

8. The electronic plumbing fixture fitting, according to claim 4, wherein at least one of the at least one processor and the TOF sensor is configured to exclude from the detection zone substantially all of the sensing signal volume between the expected fluid flow volume and the faucet body proximate the TOF sensor, thereby permitting the faucet body proximate the TOF sensor to be wiped clean without causing the processor to open the electronically controlled valve while it is closed.

9. An electronic plumbing fixture fitting, comprising:
a faucet body, the faucet body being operable to mount above a mounting surface, the faucet body including a discharge outlet, the discharge outlet being operable to deliver water through an expected fluid flow volume;
an electronically controlled valve in fluid communication with the faucet body upstream of the discharge outlet;
at least one processor programmed to control the electronically controlled valve to selectively control a flow of fluid from the electronically controlled valve out the discharge outlet of the faucet body; and
a time-of-flight (TOF) sensor operably connected with the faucet body and positioned to transmit a sensing signal toward the expected fluid flow volume in a sensing signal volume; and
wherein at least one of the at least one processor and the TOF sensor is configured to create a detection zone inside the sensing signal volume and overlapping at least a portion of the expected fluid flow volume;
wherein at least one of the at least one processor and the TOF sensor is configured to permit the TOF sensor to detect the presence or absence of an object in the detection zone while no water is flowing out of the discharge outlet;
wherein at least one of the at least one processor and the TOF sensor is configured to permit the TOF sensor to detect the presence or absence of an object in the detection zone while delivered water is flowing in the expected fluid flow volume in the detection zone;
wherein the TOF sensor is electrically coupled to the at least one processor to communicate to the at least one processor TOF data representing one or more of (a) the presence or absence of an object in the detection zone, (b) a distance of an object in the detection zone, and (c) a time of travel of a signal indicating an object in the detection zone;
wherein the at least one processor has code causing the at least one processor to selectively open the electronically controlled valve to cause a flow of fluid from the electronically controlled valve out the discharge outlet in the expected fluid flow volume responsive to at least the TOF data; and
wherein the at least one processor has code causing the at least one processor to selectively close the electronically controlled valve to stop the flow of fluid from the electronically controlled valve out the discharge outlet in the expected fluid flow volume responsive to at least TOF data collected while the flow of fluid is flowing in the expected fluid flow volume in the detection zone.

10. The electronic plumbing fixture fitting according to claim 9, wherein at least one of the at least one processor and the TOF sensor is configured to exclude from the detection zone at least a portion of the sensing signal volume between the expected fluid flow volume and the faucet body proximate the TOF sensor, thereby permitting the faucet body proximate the sensing signal volume to be wiped clean without causing the processor to open the electronically controlled valve while it is closed.

11. The electronic plumbing fixture fitting, according to claim 9, wherein at least one of the at least one processor and the TOF sensor is configured to exclude from the detection zone at least a distal portion of the sensing signal volume past the expected fluid flow volume, thereby permitting a user to walk up to the electronic plumbing fixture fitting without causing the processor to open the electronically controlled valve while it is closed.

12. The electronic plumbing fixture fitting, according to claim 10, wherein at least one of the at least one processor and the TOF sensor is configured to exclude from the detection zone at least a distal portion of the sensing signal volume past the expected fluid flow volume, thereby permitting a user to walk up to the electronic plumbing fixture fitting without causing the processor to open the electronically controlled valve while it is closed.

13. The electronic plumbing fixture fitting, according to claim 9, wherein at least one of the at least one processor and the TOF sensor is configured to exclude from the detection zone substantially all of the sensing signal volume between the expected fluid flow volume and the faucet body proximate the TOF sensor, thereby permitting the faucet body proximate the TOF sensor to be wiped clean without causing the processor to open the electronically controlled valve while it is closed.

14. The electronic plumbing fixture fitting, according to claim 10, wherein at least one of the at least one processor and the TOF sensor is configured to exclude from the detection zone substantially all of the sensing signal volume between the expected fluid flow volume and the faucet body proximate the TOF sensor, thereby permitting the faucet body proximate the TOF sensor to be wiped clean without causing the processor to open the electronically controlled valve while it is closed.

15. The electronic plumbing fixture fitting, according to claim 11, wherein at least one of the at least one processor and the TOF sensor is configured to exclude from the detection zone substantially all of the sensing signal volume between the expected fluid flow volume and the faucet body proximate the TOF sensor, thereby permitting the faucet body proximate the TOF sensor to be wiped clean without causing the processor to open the electronically controlled valve while it is closed.

16. The electronic plumbing fixture fitting, according to claim 12, wherein at least one of the at least one processor and the TOF sensor is configured to exclude from the detection zone substantially all of the sensing signal volume between the expected fluid flow volume and the faucet body proximate the TOF sensor, thereby permitting the faucet body proximate the TOF sensor to be wiped clean without causing the processor to open the electronically controlled valve while it is closed.

17. The electronic plumbing fixture fitting, according to claim 9:
wherein at least one of the at least one processor and the TOF sensor is configured to permit the TOF sensor to detect the presence or absence of a user's hand in the detection zone while no water is flowing out of the discharge outlet;
wherein at least one of the at least one processor and the TOF sensor is configured to permit the TOF sensor to detect the presence or absence of a user's hand in the detection zone while delivered water is flowing in the expected fluid flow volume in the detection zone;
wherein the TOF sensor is electrically coupled to the at least one processor to communicate to the at least one processor TOF data representing one or more of (a) the presence or absence of a user's hand in the detection zone, (b) a distance of a user's hand in the detection zone, and (c) a time of travel of a signal indicating a user's hand in the detection zone;
wherein the at least one processor has code causing the at least one processor to selectively open the electronically controlled valve to cause a flow of fluid from the electronically controlled valve out the discharge outlet in the expected fluid flow volume responsive to at least the TOF data indicating the presence of a user's hand in the detection zone;
wherein the at least one processor has code causing the at least one processor to selectively close the electronically controlled valve to stop the flow of fluid from the electronically controlled valve out the discharge outlet in the expected fluid flow volume responsive to at least TOF data collected while the flow of fluid is flowing in the expected fluid flow volume in the detection zone;
wherein at least one of the at least one processor and the TOF sensor is configured to exclude from the detection zone at least a portion of the sensing signal volume between the expected fluid flow volume and the faucet body proximate the TOF sensor, thereby permitting the faucet body proximate the sensing signal volume to be wiped clean without causing the processor to open the electronically controlled valve while it is closed; and
wherein at least one of the at least one processor and the TOF sensor is configured to exclude from the detection zone at least a distal portion of the sensing signal volume past the expected fluid flow volume, thereby permitting a user to walk up to the electronic plumbing fixture fitting without causing the processor to open the electronically controlled valve while it is closed.

18. The electronic plumbing fixture fitting, according to claim 16:
wherein at least one of the at least one processor and the TOF sensor is configured to permit the TOF sensor to detect the presence or absence of a user's hand in the detection zone while no water is flowing out of the discharge outlet;
wherein at least one of the at least one processor and the TOF sensor is configured to permit the TOF sensor to detect the presence or absence of a user's hand in the detection zone while delivered water is flowing in the expected fluid flow volume in the detection zone;
wherein the TOF sensor is electrically coupled to the at least one processor to communicate to the at least one processor TOF data representing one or more of (a) the presence or absence of a user's hand in the detection zone, (b) a distance of a user's hand in the detection zone, and (c) a time of travel of a signal indicating a user's hand in the detection zone;
wherein the at least one processor has code causing the at least one processor to selectively open the electronically controlled valve to cause a flow of fluid from the electronically controlled valve out the discharge outlet in the expected fluid flow volume responsive to at least the TOF data indicating the presence of a user's hand in the detection zone;
wherein the at least one processor has code causing the at least one processor to selectively close the electronically controlled valve to stop the flow of fluid from the electronically controlled valve out the discharge outlet in the expected fluid flow volume responsive to at least TOF data collected while the flow of fluid is flowing in the expected fluid flow volume in the detection zone;
wherein at least one of the at least one processor and the TOF sensor is configured to exclude from the detection zone at least a portion of the sensing signal volume between the expected fluid flow volume and the faucet body proximate the TOF sensor, thereby permitting the faucet body proximate the sensing signal volume to be wiped clean without causing the processor to open the electronically controlled valve while it is closed; and
wherein at least one of the at least one processor and the TOF sensor is configured to exclude from the detection zone at least a distal portion of the sensing signal volume past the expected fluid flow volume, thereby permitting a user to walk up to the electronic plumbing fixture fitting without causing the processor to open the electronically controlled valve while it is closed.

19. An electronic plumbing fixture fitting, comprising:

a faucet body including a discharge outlet, the discharge outlet being operable to deliver water through an expected fluid flow volume;

an electronically controlled valve in fluid communication with the faucet body upstream of the discharge outlet;

at least one processor programmed to control the electronically controlled valve to selectively control a flow of fluid from the electronically controlled valve out the discharge outlet of the faucet body; and a plurality of sensors in electrical communication with the processor and operably connected to the faucet body and positioned to transmit a sensing signal toward the expected fluid flow volume in a sensing signal volume, the plurality of sensors located in different locations and having overlapping sensing signal volumes creating a shaped and limited sensor detection zone that overlaps at least a portion of the expected fluid flow volume; and wherein at least one of the at least one processor and the plurality of sensors is configured to permit the plurality of sensors to detect the presence or absence of an object in the detection zone.

20. The electronic plumbing fixture fitting, according to claim 19, wherein at least one of the at least one processor and the plurality of sensors is configured to permit the plurality of sensors to detect the presence or absence of an object in the detection zone whether or not water is flowing out of the discharge outlet through the expected fluid flow volume.

* * * * *